Oct. 20, 1931.            G. NENNA            1,827,853
VEHICLE PARKING DEVICE
Filed March 21, 1930        2 Sheets-Sheet 1
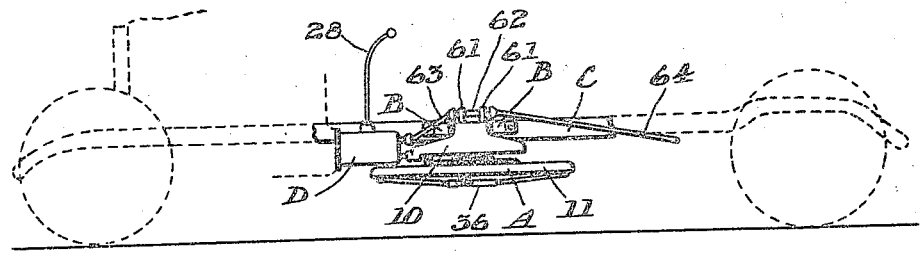
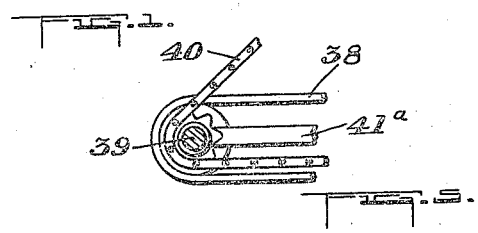
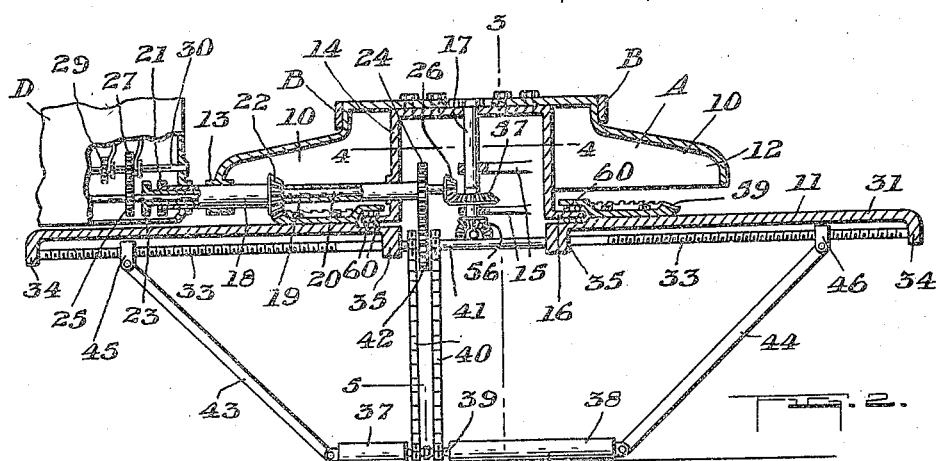
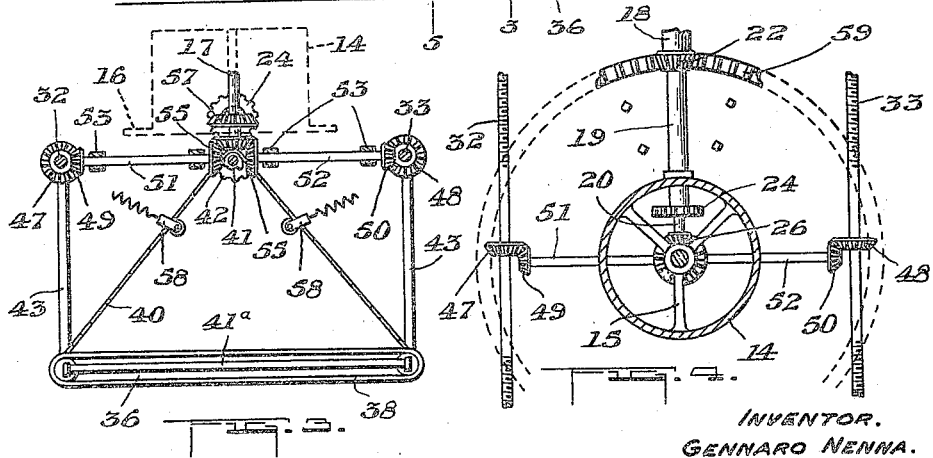
INVENTOR.
GENNARO NENNA.
BY *Smut F Biggar*
ATT'YS.

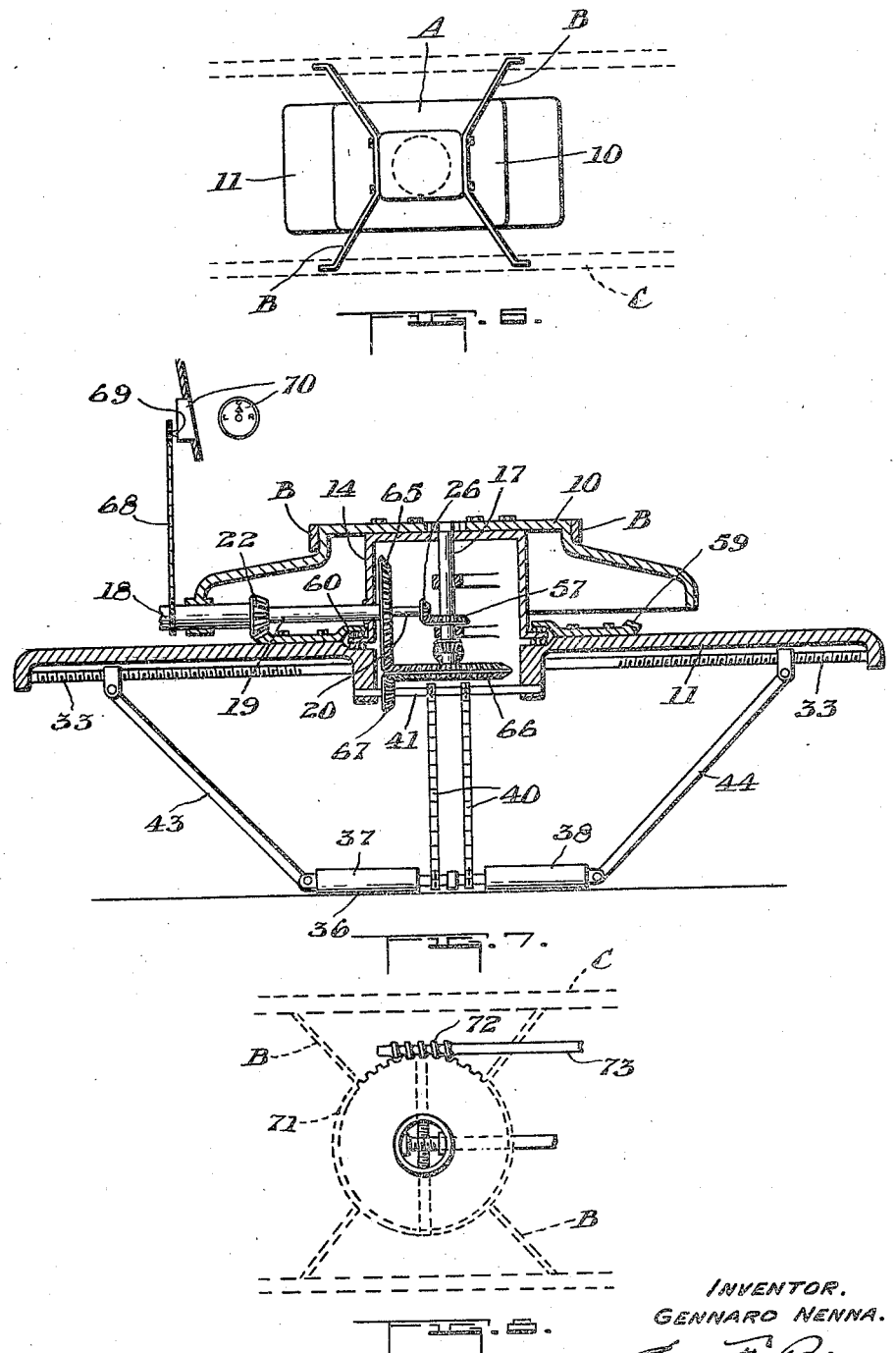

Patented Oct. 20, 1931

1,827,853

UNITED STATES PATENT OFFICE

GENNARO NENNA, OF OWEN SOUND, ONTARIO, CANADA, ASSIGNOR TO CHRISTOS GEORGAS, OF OWEN SOUND, ONTARIO, CANADA

VEHICLE PARKING DEVICE

Application filed March 21, 1930. Serial No. 437,876.

This invention relates to improvements in vehicle parking devices and generally speaking is that type of device adapted to be secured to the chassis of the vehicle.

One of the principal objects of the present invention is to provide an improved device of this character which will enable the vehicle to be parked in substantially any position without the necessity of the driver or operator leaving his seat.

Another object of the invention is to provide a device operative through the transmission of the motor vehicle.

A further object of the invention is to provide a parking device which may be readily and conveniently operated, and which, when in an inoperative position, is so collapsible as to provide sufficient road clearance. At the same time provide a device which may be employed in emergency as a brake medium where the saving of life is concerned.

A still further object of the present invention is to provide a parking device which will enable the motor vehicle to be moved to a parking position at substantially any desired angle and at the same time provide means for completely reversing the directional position of the motor vehicle.

Yet a further object embodied in the present invention is the novel means whereby the motor vehicle may be elevated on the road, turned to a desired position and parked, each of the respective operations being independent of one another.

Having regard to the foregoing and other advantageous objects which will appear as the description of the invention proceeds, the invention consists essentially of a substantially bell shaped member carried by the chassis, having associated therewith, a secondary unit. Collapsible arms having a road contacting conveyer connected, are associated with the secondary unit, the mechanism of which, is operated through the operation of the transmission, as will be fully described in detail in the accompanying drawings, in which:—

Figure 1 is a side elevation of a motor vehicle showing my improved parking device in an inoperative position.

Figure 2 is an enlarged longitudinal sectional elevation, illustrating the operative mechanism and its connection with the transmission.

Figure 3 is a section taken on the line 3—3 of Figure 2.

Figure 4 is a section taken on the line 4—4 of Figure 2.

Figure 5 is an enlarged detail sectional view taken on the line 5—5 of Figure 2.

Figure 6 is a plan view of my improved device as it would appear mounted in the chassis of a motor vehicle.

Figure 7 is a longitudinal section indicating a modified form of my improved device, and Figure 8 is a plan view of a modified form of means for operating the parking device.

The invention itself, which is now referred to in detail and in which like characters of reference indicate corresponding parts throughout the several illustrations, comprises the device as a whole which is indicated generally by the character A. The parking device is secured by the arms B or other suitable means to the chassis C of a motor vehicle which is provided with a transmission which is indicated by the character D.

The device as a whole, may be said to be formed in two units indicated by the numerals 10 and 11. The former constituting the upper unit and the latter the lower, one of which is rotatable with respect to the other. The upper unit comprises a substantially bell shaped structure such as is indicated at 12, one end of which is provided with a bearing 13. Within the member 12 and fixedly secured thereto by bolts or other suitable securing means, is a centrally supported housing member 14 provided with shaft supporting arms 15 and a flange or collar 16. Mounted centrally of the member 14 is a shaft 17, the purpose of which will be hereinafter more fully referred to.

Supported by the bearing 13 and extending from the transmission D to the interior of the housing member 12, are a series of telescopically arranged shafts which are indicated by the numerals 18, 19 and 20, each of which have a respective function to perform. The shaft 18, it will be noted, is in the form of a sleeve and is provided at the transmission end with a gear 21 and at the opposite end with a bevel gear 22. The shaft 19, which is rotatable within the sleeve shaft 18, is also provided with a transmission gear 23 and at its opposite end a drive gear 24. The central shaft 20 is rotatable within the sleeve shaft 19 and is provided at the transmission end with a gear 25 and at its opposite end with a bevel pinion 26.

The operation of the gears 21, 23 and 25 may be effected by the ordinary transmission with auxiliary gearing or on the other hand, subsidiary gear operating means may be incorporated in a specially constructed transmission.

In the present instance, the sliding transmission gear 27 which may be operated by the gear shift lever 28, is adapted to be moved into and out of mesh with the gears 25, 23, and 21 according to the operation desired, as will be later referred to. The gear 29 being for the purpose of reversing the rotatable movement of the shaft 30 upon which the gear 27 is mounted.

Coming now to the lower or secondary unit of the device, which is indicated by the numeral 11, this comprises a rectangular housing 31, the longitudinal sides of which are provided with shafts 32 and 33. The shaft 32 as particularly illustrated in Figure 4, is provided with right and left hand threads, while the shaft 33 is also provided with differently threaded portions. These threaded shafts are rotatably mounted in the ends and center of the member 31, as indicated at 34 and 35 respectively.

Disposed beneath the member 31 is a conveyer or road engaging member 36. This member comprises endless belts 37 and 38, mounted on roller carrying shafts 39, the shafts 39 being in turn connected through sprockets, the drive chains 40 with the sprockets mounted on the shaft 41. Transverse supporting arms 41ª are provided for stabilizing the skeleton frame of the conveyer 36. The gear 42 also mounted on the shaft 41 is adapted to mesh with the gear 24, previously referred to.

Pivotally connected to each end of the conveyer member 36 is a pair of supporting arms 43 and 44. The opposing ends of these arms, as particularly illustrated in Figure 2, are pivotally connected by means of the threaded collars 45 and 46, to the threaded shafts 32 and 33 respectively.

The drive means for the threaded shafts 32 and 33 and the conveyer 36, are clearly illustrated in Figures 3 and 4. The threaded shafts 32 and 33 are provided substantially midway thereof, with bevel gears 47 and 48. Meshing with the gears 47 and 48 are a further pair of bevel gears 49 and 50 which are mounted on the cross shafts 51 and 52.

The shafts 51 and 52 are supported in suitable bearings 53 and are provided at their inner ends with further bevel gears 54 and 55, which are driven by the gear 56 mounted on the shaft 16, which also causes its driving gear 57 to mesh with the gear 26.

During the operation of parking the motor vehicle, the conveyer 36 is first lowered in such a manner as to elevate the car for parking purposes and after it has performed its operation, is collapsed so as to provide sufficient road clearance. In order to take care of the flexible drive means for the conveyer when either in operative or collapsed position, some means must be provided to absorb the slack of the conveyer drive chains. In the present instance I provide the roller carrying members 58 which may conveniently be spring connected to the chassis of the vehicle, so that as the conveyer 36 is moved from an operative to a collapsed position, the spring actuated members 58 will exert a pull on any slack created in the drive chains 40 due to the collapsing operation and thus the drive chains are always properly tensioned for operating or driving purposes.

Coming now to the means by which the motor vehicle is rotated, this comprises a comparatively large bevel gear 59 securely fixed to the face of the member 31 and with which the bevel gear 22 is adapted to mesh. The inner periphery of the gear 59 and member 31 within which the flange 16 is carried is provided with suitable ball-bearings indicated at 60.

Owing to the central position of the parking device, which would be positioned in the vehicle frame at the center of gravity, provision is made for carrying the drive shaft over the top of the device A. Any convenient means may be employed and I have indicated, as particularly disclosed in Figure 1, bearing members 61 supporting the shaft 62 which is connected by means of universal couplings to the shaft 63 and 64, the former connecting the transmission drive shaft and the latter the differential as is well known.

In operation, and assuming that the parking device is in collapsed or inoperative as indicated in Figure 1 and it is desired to park the vehicle, the gear shaft lever 28 is operated so as to place the gear 27 into mesh with the gear 25 and rotate the shaft 20. The rotation of this shaft will rotate the gears 26, 57, 56, 49, 50, 47 and 48, and through them rotate the threaded shafts 32 and 33, causing the arms 43 and 44 to be pulled together. This accordingly, will cause the downward movement of the conveyer 36.

When the member 36 has been sufficiently extended to elevate the motor vehicle, the gear 27 is then moved out of mesh with the gear 25 and into mesh with the gear 23 mounted on the hollow shaft 19. The rotation of this shaft will operate the gears 24 and 42 and the chains 40 which in turn, through the shafts 39, operate the conveyer members 37 and 38 will move the motor vehicle either right or left as desired to a parking position. In order to restore the parking device to its normal inoperative position, the operation just described, is reversed. This is effectively accomplished by operating the reverse gear 29.

Should it be desired to turn the vehicle upon its axis, the gear 27 is moved into mesh with the gear 21. This will rotate the shaft 18 and with it the bevel gear 22 which is in mesh with the gear 59, mounted on the member 31. This operation will cause the vehicle as a whole to be turned to any desired position.

In the modified form of device, as illustrated in Figure 7, the structure and operation is substantially the same as that illustrated in Figure 2. The difference in the two structures resides mainly in the means provided for operating the conveyer irrespective of the relative position of the members 10 and 11.

This difference in structure mainly comprises the bevel gear 65 which is substituted for the gear 24 which meshes with the double faced gear 66 which in turn meshes with the bevel gear 67 mounted on the shaft 41 which forms the driving means for the conveyer 36.

It will be observed from the structure illustrated in this connection, that irrespective of the position of the member 10 with respect to the member 11, the conveyer 36 may be operated. In addition to the foregoing, I provide means for indicating the relative position of the conveyer with respect to the directional movement of the vehicle itself. This means comprises a sprocket mounted on the hollow shaft 18 which is connected by means of a belt or chain 68, to a sprocket on the shaft 69, which operates the indicator 70 conveniently mounted on the instrument board, and thus enables the driver of the vehicle to visualize the position of the conveyer prior to parking or unparking the motor vehicle.

In the further modification illustrated in Figure 8, which effects the turning operation, I substitute the worm gear 71 for the gear 59 and operate this gear through the medium of the worm 72, mounted on the shaft 73 and driven in suitable manner.

As many changes could be made in the above construction and many apparently widely different embodiments of my invention, within the scope of the claims, constructed without departing from the spirit or scope thereof, it is intended that all matter contained in the accompanying specification and illustrated in the drawings shall be interpreted as illustrative and not in a limiting sense.

What I claim as my invention is:

1. A device of the character described comprising an upper and a lower frame rotatably connected together, a supplementary housing mounted in the upper frame, a series of rotatable telescopically arranged shafts associated with the upper frame, gears on the shafts, a pair of threaded shafts carried by the lower frame, a conveyer member, pivotally mounted arms connecting the conveyer member with the threaded shafts, drive means for operating the conveyer and gear means connecting the upper and the lower frames for relative rotative movement.

2. In a vehicle parking device, an upper and lower unit, rotatably connected together, a supplementary housing carried by the upper unit, a centrally disposed shaft mounted in said housing, gears mounted on the centrally disposed shafts, a series of telescopically arranged shafts associated with the upper unit, gears mounted on the shafts, a conveyer member, threaded shafts and pivotally supporting arms connecting the conveyer to the lower unit, gears for the threaded shafts, gear means connecting the centrally disposed shaft gears and the threaded shaft gears and means for operating the conveyer member.

3. A device of the character described comprising in combination with a motor vehicle and a power transmission, of an upper unit rigidly secured to the vehicle frame, a lower unit rotatably associated with the upper unit, a conveyer member adapted to be extended to the road surface and elevate the motor vehicle, supporting arms for the conveyer, operative means for raising and lowering the conveyer, operative means for driving the conveyer, operative means for rotating the vehicle when elevated and a plurality of telescopically arranged shafts associated with the transmission and adapted to independently drive the said operative means.

4. A device as set forth in claim 3, in which the conveyer member comprises a plurality of roller operated endless belts.

In witness whereof I have hereunto set my hand.

GENNARO NENNA.